Patented Sept. 10, 1929.

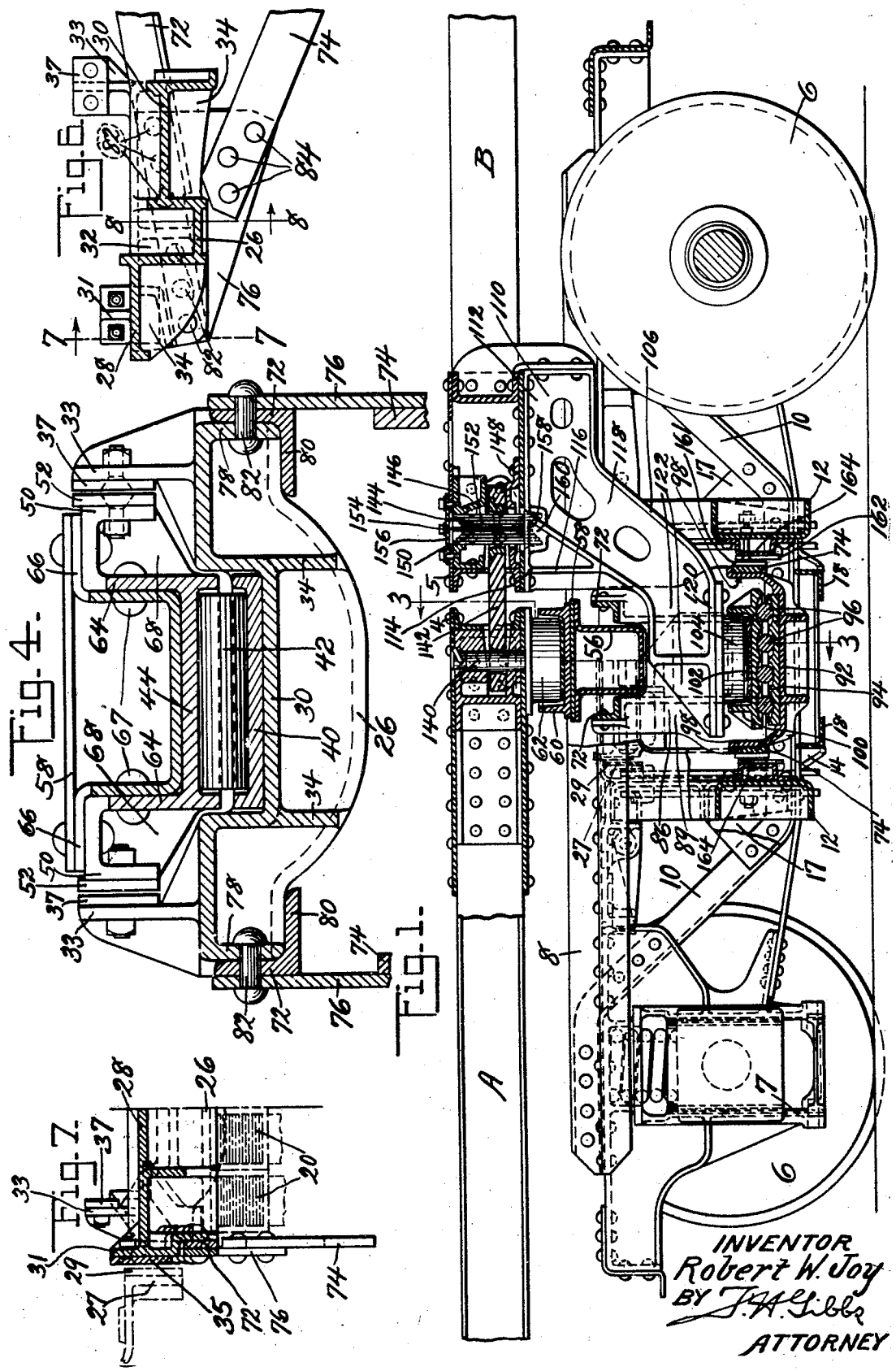

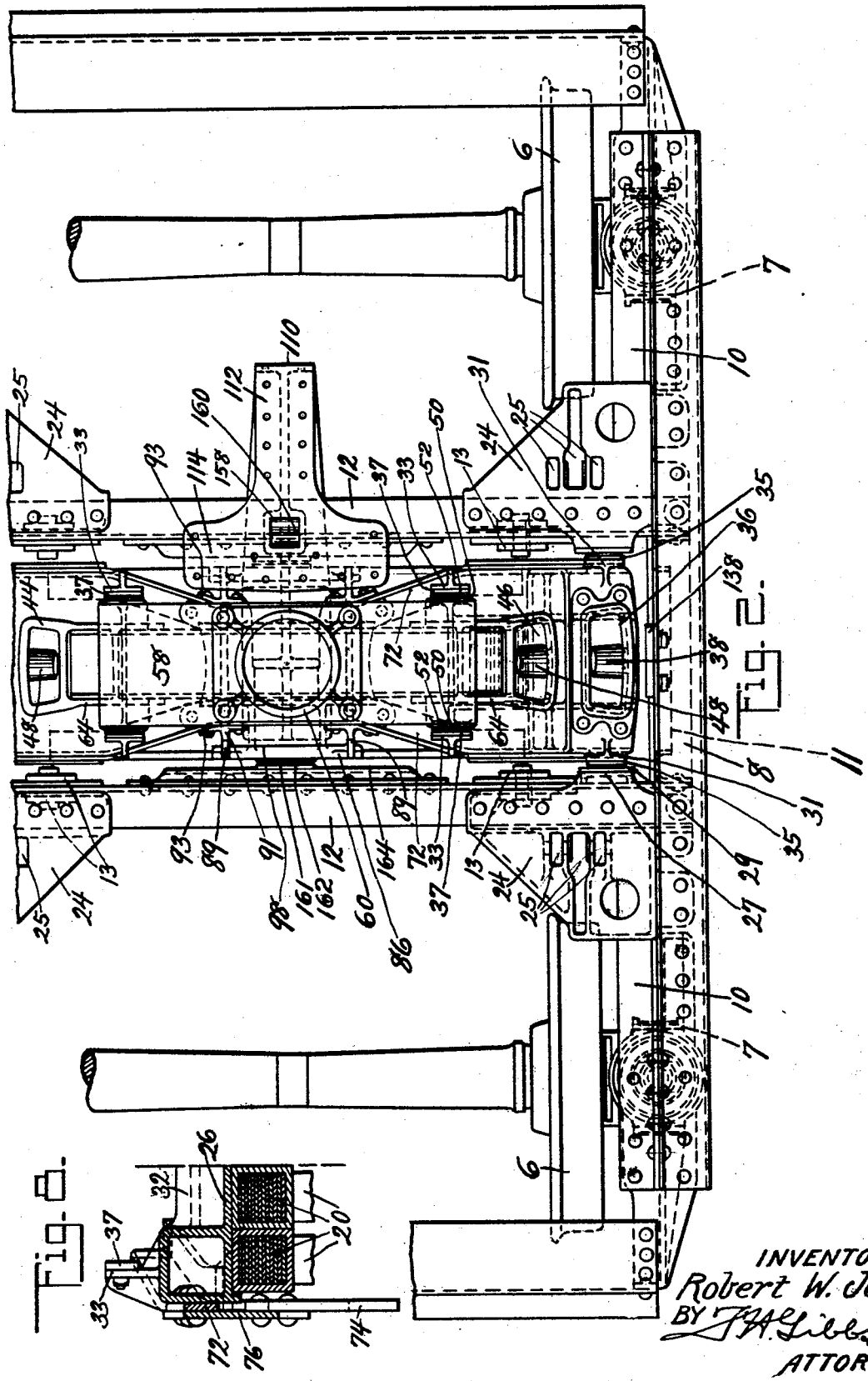

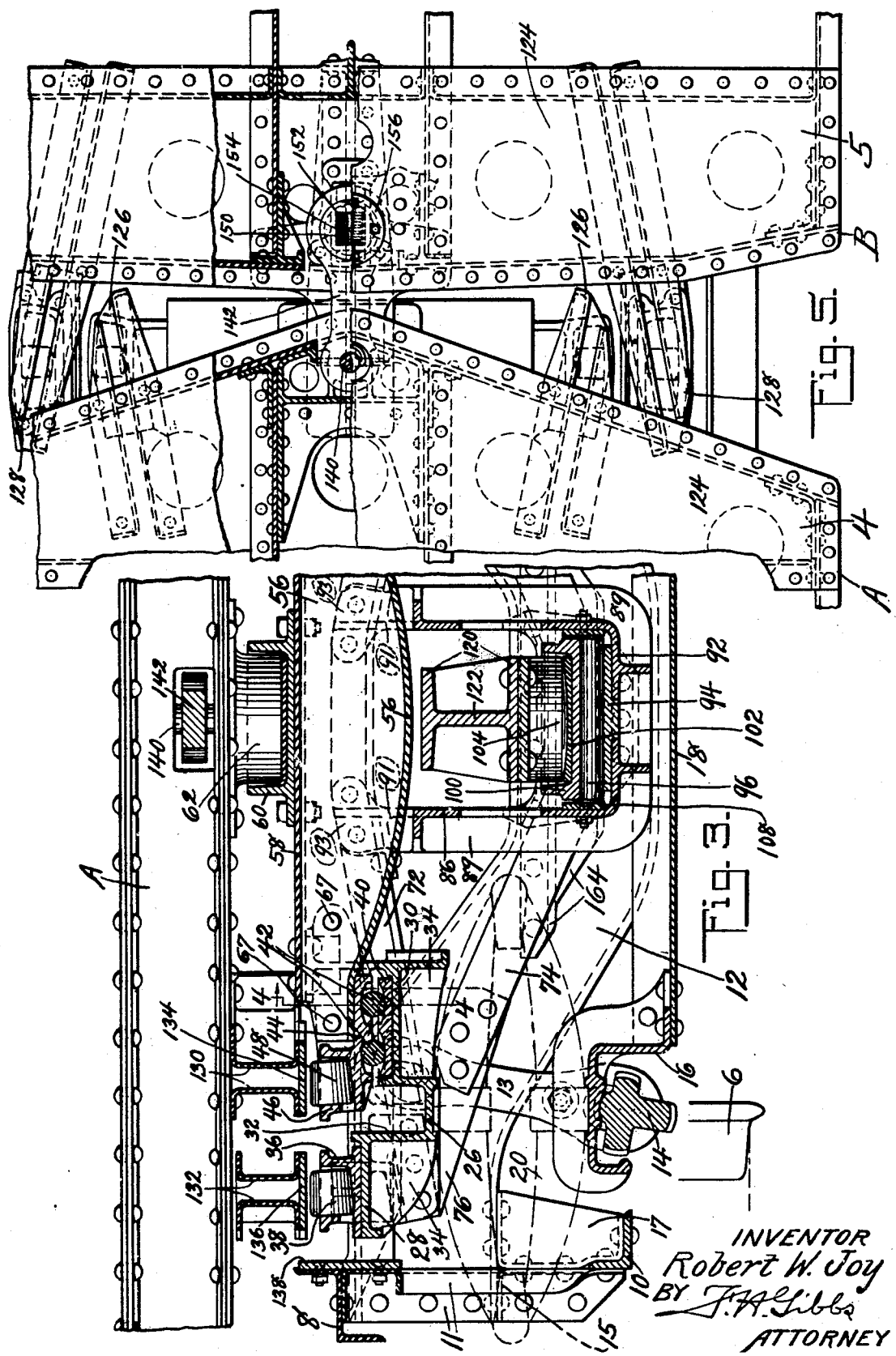

1,727,710

UNITED STATES PATENT OFFICE.

ROBERT W. JOY, OF BROOKLYN, NEW YORK, ASSIGNOR TO AMERICAN CAR AND FOUNDRY COMPANY, OF NEW YORK, N. Y., A CORPORATION OF NEW JERSEY.

ARTICULATED CAR.

Application filed December 1, 1927. Serial No. 237,012.

Reference is had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In the drawings:

Figure 1 is a view partly in elevation and partly in vertical section of a car truck supporting the adjacent ends of two car bodies in accordance with this invention, the bodies being indicated by the ends of the underframes which are shown partly in elevation and partly in vertical section;

Fig. 2 is a partial top plan view of the truck shown in Fig. 1, the bodies or underframes being removed;

Fig. 3 is a partial vertical transverse section taken on the line 3—3 of Fig. 1;

Fig. 4 is a fragmentary vertical section taken on the line 4—4 of Fig. 3 and drawn to a larger scale;

Fig. 5 is a partial top plan view of the adjacent ends of the underframe shown in Fig. 1, parts being broken away to show other parts more clearly and the truck being in greater part omitted;

Fig. 6 is a detail view of one end of the truss bolster and the spring cap;

Fig. 7 is a sectional view on the line 7—7 of Fig. 6; and

Fig. 8 is a sectional view on the line 8—8 of Fig. 6.

This invention relates to transportation cars and has particular reference to railway cars of the articulated unit type.

One object of this invention is to provide an improved means for supporting the adjacent ends of two car bodies on a single car truck which will permit of free relative movements of the bodies with respect to each other and with respect to the car truck.

A further object of the invention is to provide an improved means for connecting the adjacent ends of two car bodies supported by a common truck which will permit of free relative movements of the bodies with respect to each other and to the car truck.

Other objects and advantages of this invention will be apparent from the following description taken in conjunction with the accompanying drawings in which an articulated car unit is shown for mounting and connecting the adjacent ends 4 and 5 of two railway cars A and B respectively, the car ends only being shown in the drawings.

The invention includes a car truck mounted on wheels 6 and having a frame including the pedestals 7, the top chords 8 in the form of Z-bars, the trusses 10 and a center brace 11. The truck is further provided with spaced transoms 12 which are secured to the top chords 8, center braces 11 and two pressings 15 and 17 secured to the center braces and trusses 10. From the transoms 12 are hung the swing links 13 which support the swing link adjuster or cross-bar 14. The cross-bar 14 may be adjusted in any suitable manner and it supports the elliptic springs 20. Mounted on the adjustable cross-bar 14 is the reinforced truck spring seat 16 to which is secured the spring plank 18. The transoms 12 do not extend straight across the truck but are provided with a dipped portion intermediate their ends for a purpose hereafter to be described. The top chords 8 and transoms 12 are connected by gussets 24, apertured as at 25, for the reception of the brake levers and hangers, not shown, and are provided with a depending protruding element 27 carrying a wear plate 29, as shown clearly in Figs. 1, 2 and 7.

Mounted on the springs 20 are the spring caps indicated generally at 26 which are preferably of the form shown in detail in Fig. 6 and comprise the oppositely arranged supporting portions 28 and 30 respectively and the intermediate recessed portion 32, the spring caps being preferably reinforced by webs 34.

The supporting portions mount side bearings, and from Fig. 3 it can be seen that portion 28 has a socket 36 secured thereto which receives the bearing 38. The supporting portion 30 is recessed and receives a bearing plate 40 on which the bearings 42 are seated. The side bearing for this portion 30 comprises an elongated plate 44 seated on the bearings 42; the lower face of said plate being recessed to accommodate said bearings. The plate 44 is provided with a socket 46 which receives a bearing 48, and referring to Figs. 2 and 4, the plate 44 is shown as provided with upwardly extending flanged sides 64 providing a guide element 50 which has opposed wear plates 52 secured thereto.

The spring cap is provided with guides, and as shown particularly in Figs. 4 and 6, it can be seen that each supporting portion 28 and 30 is provided with opposed pairs of upstanding guide elements 31 and 33 respectively, each provided with a wear plate indicated at 35 and 37 respectively. The guides 31 are adapted to contact with the wear plates 29 heretofore described, and the guides 33 contact with the wear plates 52, heretofore mentioned.

The plate 44 is secured to and supports an upper bolster 56, the end of which extends in the guide formed by the flange 50, said bolster being provided with a cover plate 58 to which is secured a truck center bearing 60 in which the body center bearing 62 is mounted; the latter being secured to the end of car A by any suitable fasteners.

The plate 44 is provided with flanged sides 64, as before-mentioned, and the bolster is substantially a channel having lateral flanges 66 which seat upon the flanges of the plate sides, said bolster being rigidly connected to the plate sides 64 by rivets 67 or other suitable fasteners. For reinforcing purposes, the sides of plate 44 are provided with webs 68. A truss bolster is also provided with the present invention, and in general is arranged beneath the bolster 56 and comprises the opposed compression or upper members 72 in the form of angles, and the tension, truss or lower members 74; the ends of said upper and lower members being connected by gussets 76. Referring to Fig. 4, the vertical legs of the compression members are each arranged adjacent the depending side edge flanges 78 of the spring cap, and the horizontal legs 80 are extended inwardly to aid in supporting the spring cap; the ribbed webs of the spring cap resting on such legs. The truss bolster is rigidly secured to the spring cap by means of rivets 82, and rivets 84 are provided to connect the tension member with the gusset 76. As shown particularly in Fig. 2, the compression members of the truss bolster are bowed inwardly, and a lower center bearing casting, indicated generally at 86, is provided, the latter being provided with spaced reinforcing webs 89 which extend upwardly above the casting, as at 91 (see Fig. 3) and terminate in attaching ears 93 secured to the compression members by rivets or the like, thereby reinforcing the center bearing casting and the compression members at the bowed portion of the latter. The casting 86 is generally of the form shown more clearly in Figs. 1 and 3, and is provided with a bottom 92 in which is a bearing plate 94 which latter supports bearings 96 preferably of the roller type. The lower end of the casting is flanged as at 98 to bear upon and be supported by the tension members of the truss bolster, and positioned within the casting 86 and riding on the bearings 96 is a socket member 100 having a center plate 102 upon which the center bearing 104 swivelly rests; the latter being secured to the lower end of a cantilever bar 106 secured to and extending downwardly from the end of car B. As heretofore mentioned, the transoms are dipped intermediate their ends, thus permitting the positioning of the bar 106, as will be apparent. Suitable wear plates 108 are provided within the casting for an obvious purpose.

The structure of the cantilever bar 106 is deemed important, and it can be seen that the same is provided with an attaching portion 110 which is secured to the underframe of car B by suitable rivets; the attaching portion comprising a rearwardly extending arm 112 and a substantially wide head portion 114 braced by means of an integral brace 116 which is arranged directly under the edge of the car end 5. The attaching portion merges into an angularly arranged portion 118 which terminates in an offset portion 120 to which the center bearing 104 is secured. The offset portion 120 is reinforced by webs 122. It will be obvious that by providing a cantilever bar of the specific construction just described, it is not necessary to extend the attaching portion 110 back a substantial distance from the end of the car. It will further be apparent that down thrust of the car body will be transmitted directly to the center bearing 104, to be taken up by the rollers and the center casting.

The ends of cars A and B are each provided with cover plates 124, and extending from the ends in such position as to overlie the bearings 38 and 48 are body side bearings indicated generally at 126 and 128, the same being formed of spaced pressed channels 130 and 132 respectively connected by wear plates 134 and 136, as shown clearly in Fig. 3. The side bearings 126 of car A are positioned within the bearings 128 of car B, and said bearings are so arranged as to overlap each other and to permit relative movement of the cars A and B without contact between said side bearings. It will be apparent that the bearings 126 are necessarily arranged within the bearings 128 in order that they may contact with the bearings 48, as will be obvious.

Secured to the top chords 8 of the truck frame and to the center brace 11, is a wear plate 138 for the purpose of taking lateral impact of the entire bolster assembly, it being apparent that due to the swing links 13, under certain conditions, the entire bolster assembly will oscillate. Extreme oscillation will cause impact of the assembly with the truck side frame, which will be taken by the wear plate 138.

The end of car A is adapted to receive a pin 140 which passes through an opening in one end of a drawbar 142, the opposite end of which latter is provided with a ferruled aperture in which is seated a multi-part spring 144 positioned in an upper casting 146 and lower casting 148. In practice the spring 144 is formed of parts 150 and 152 having a separate center retainer 154 which can be removed through an opening formed in the car end and normally closed by a plate 156. As shown clearly in Fig. 1, the attaching portion of the cantilever bar is preferably formed with a well 158 having a separator 160 therein which divides the well into two portions, each of which receives one of the spring sections. This particular construction affords a positive centering of the spring and results in providing an arrangement in which the drawbar is always acting on the spring at its normal center. As before-mentioned, the center retainer 154 is removable from between the spring sections. When the retainer 154 is in position, as shown in Fig. 1, the same in effect wedges the spring sections to form a unitary whole, but when the center retainer is removed, which is done by removing the plate 156 and withdrawing the retainer, either or both of the spring sections may then be removed from their engagement with the drawbar, thus freeing the drawbar from its engagement with car B.

Attached to the tension members, adjacent the center bearing casting are wear plates 161, which are so arranged as to contact with corresponding wear plates 162, secured to brackets 164 attached to transoms 12.

What is claimed is:

1. In an articulated car construction, a car truck having a plurality of bolsters and a car end supported by each of said bolsters.

2. In an articulated car construction, a car truck having a plurality of bolsters arranged one above the other and a car end supported by each of said bolsters.

3. In an articulated car construction, a car truck having a plurality of relatively movable bolsters and a car end supported by each of said bolsters.

4. In an articulated car, a car truck having a plurality of relatively movable bolsters arranged one above the other and a car end supported by each of said bolsters.

5. In an articulated car construction, a car truck having a plurality of bolsters and a car end supported by each of said bolsters, one of said car ends being movable relatively to its supporting bolster.

6. In an articulated car construction, a car truck having a plurality of bolsters arranged one above the other and a car end supported by each of said bolsters, one of said car ends being movable relatively to its supporting bolster.

7. In an articulated car construction, a car truck having a plurality of bolsters arranged one above the other and a car end supported by each of said bolsters, the lower bolster being movable relatively to the car end supported thereby.

8. In an articulated car construction, a car truck having a frame, a spring plank movably supported from said frame, springs carried by said spring plank, spring caps carried by said springs, a bolster carried by and moving with said spring caps, a second bolster carried by and movable relatively to said spring caps and a car end supported by each of said bolsters.

9. In an articulated car construction, a car truck having a frame, a spring plank carried by said frame and having movement transversely of the truck, springs carried by said spring plank, spring caps carried by said springs, a bolster carried by and moving with said spring caps, a second bolster carried by and movable relatively to said spring caps, and a car end supported by each of said bolsters.

10. In an articulated car construction, a car truck having a frame, a spring plank carried by said frame, springs carried by said spring plank, spring caps carried by said springs, a bolster carried by and moving with said spring caps, and a second bolster carried by said spring caps and having movement transversely of said truck relatively to said spring caps.

11. In an articulated car construction, a car truck, car ends overlapping the truck, a plurality of bolsters supported by the truck and arranged one above the other, a car end supported by each bolster, a draw-bar extending between the car ends, a pin securing the draw-bar to one car end, and spring means in the other car end for securing the draw-bar thereto.

12. In an articulated car construction, a car truck having a plurality of bolsters arranged one above the other, a car end supported by each of said bolsters and side bearings for each of the car ends mounted in fixed positions relatively to the respective bolsters.

13. In an articulated car construction, a car truck having a plurality of relatively movable bolsters, a car end supported by each of said bolsters and side bearings for each of said car ends moving with the respective bolsters.

14. In an articulated car construction, a car truck having a frame, a spring plank movably supported from said frame, springs carried by said spring plank, spring caps carried by said springs, a bolster carried by and moving with said spring caps, a second bolster carried by and movable relatively to said spring caps and a car end supported by each of said bolsters, and side bearings for said car ends mounted on said spring caps and second bolster.

15. In an articulated car construction, a car truck having a plurality of bolsters arranged vertically and mounted for movement transversely of the car truck and for relative movement, a car end supported by each bolster and side bearings for each car end movable with their respective bolster.

16. In an articulated car construction, a car truck having a plurality of center bearings arranged vertically and a car end pivotally mounted in each center bearing.

17. In an articulated car construction, a car truck having a plurality of center bearings arranged vertically and a car end pivotally mounted in each center bearing, one of said center bearings being movable longitudinally of the truck.

18. In an articulated car construction, a car truck having a plurality of relatively movable center bearings arranged vertically and a car end pivotally mounted in each center bearing.

19. In an articulated car construction, a car truck having a plurality of center bearings arranged one above the other and mounted for relative movement transversely of the truck, and a car end pivotally mounted in each center bearing, one of said center bearings being movable longitudinally of the truck.

20. In an articulated car unit, means for coupling two adjacent car bodies comprising an apertured casting secured in the end of one car body and provided with a slot, a draw-bar positioned in the slot, a pin securing the draw-bar, spaced upper and lower castings in the other car end between which the opposite end of the draw-bar extends, and a multi-part spring securing the draw-bar in said car end.

21. In an articulated car construction, a plurality of bolsters arranged one above the other, a car end supported by the upper bolster, a cantilever bar secured to an adjacent car end and engaging the lower bolster to support said adjacent car end, a draw-bar secured to the first named car end, a spring seat formed in the other car end, and a spring supported by said spring seat and securing the draw-bar.

22. In an articulated car construction, a car truck having a frame, a spring plank carried by said frame, springs carried by said spring plank, spring caps carried by said springs, a bolster carried by and moving with said spring caps, a second bolster carried by the spring caps and having movement transversely of said truck relatively to said spring caps, and a car end supported by each bolster, the car end supported by the first bolster being movable relatively to said bolster and longitudinally of said truck.

23. In an articulated car construction, a car truck having a frame, a spring plank carried by said frame, springs carried by said spring plank, spring caps carried by said springs, a bolster carried by and moving with said spring caps, a second bolster carried by the spring caps and having movement transversely of said truck relatively to said spring caps, a car end supported by each bolster, the car end supported by the first bolster being movable relatively to said bolster and longitudinally of said truck, and yielding means connecting said car ends.

In witness whereof I have hereunto set my hand.

ROBERT W. JOY.